United States Patent
Wehmeyer et al.

(10) Patent No.: US 6,546,091 B1
(45) Date of Patent: *Apr. 8, 2003

(54) AUTOMATIC DETECTION OF PHONE SYSTEM SETTINGS FOR DIAL-UP MODEM CONNECTIONS

(75) Inventors: Keith Reynolds Wehmeyer, Hamilton, IN (US); Daniel Robert Crupi, Hamilton, IN (US); Hugh Boyd Morrison, Marion, IN (US)

(73) Assignee: Thomson Licensing S.A., Boulogne (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,249

(22) Filed: Aug. 28, 1998

(51) Int. Cl.[7] .............................................. H04M 11/00
(52) U.S. Cl. ................................ 379/93.29; 379/93.28; 379/93.35
(58) Field of Search ........................... 379/93.29, 93.28, 379/93.05, 93.35, 93.31, 93.32, 215, 283, 286, 355, 157

(56) References Cited

U.S. PATENT DOCUMENTS

| | | | | |
|---|---|---|---|---|
| 3,740,485 A | * | 6/1973 | Nickerson | 379/138 |
| 4,852,151 A | | 7/1989 | Dittakavi et al. | 379/97 |
| 5,020,099 A | * | 5/1991 | Katagawa | 379/234 |
| 5,268,959 A | * | 12/1993 | Hong | 379/356 |
| 5,519,767 A | | 5/1996 | O'Horo et al. | 379/97 |
| 5,546,451 A | * | 8/1996 | Shen | 379/93.05 |
| 5,581,369 A | * | 12/1996 | Righter et al. | 358/442 |
| 5,930,346 A | * | 7/1999 | Chen | 379/201 |
| 5,946,390 A | * | 8/1999 | Boakes | 379/355 |
| 6,081,508 A | * | 6/2000 | West et al. | 370/238 |

FOREIGN PATENT DOCUMENTS

| | | | |
|---|---|---|---|
| GB | 2296158 | 6/1996 | H04M/1/274 |
| WO | WO94/19896 | 9/1994 | H04M/3/42 |

OTHER PUBLICATIONS

Japanese Patent Abstract Publication No. 10164260; publication date Jun. 19, 1998; inventor Kawada Takayuki; entitled "Modem".

Japanese Patent Abstract Publication No. 05199290; publication date Aug. 6, 1993; inventor Ikenotani Kiyoshi; entitled "Dial System Automatic Changeover Device".

* cited by examiner

*Primary Examiner*—Melur Ramakrishnaiah
(74) *Attorney, Agent, or Firm*—Joseph S. Tripoli; Robert D. Sheet; Frank Y. Liao

(57) ABSTRACT

A method and apparatus for automatically establishing a data connection includes a telephone line interface circuit coupled to a subscriber telephone line, and a modulator and demodulator circuit coupled to the telephone line interface circuit. A control circuit is coupled to the modulator and demodulator circuit and conditions the modulator and demodulator circuit to establish a connection to the subscriber telephone line and comprises circuitry to determine whether a central office to which the subscriber telephone line is connected is a tone-dial central office or a pulse-dial-only central office, whether a dialing prefix is necessary to access the subscriber telephone line, and whether the call waiting feature is activated on the subscriber telephone line.

9 Claims, 3 Drawing Sheets

AUTOMATIC DETECTION OF PHONE SYSTEM SETTINGS FOR DIAL-UP MODEM CONNECTIONS

FIELD OF THE INVENTION

The present invention relates to a modem in a remote location which is capable of calling a central computer under varying operating conditions, and transferring data between the remote location and the central computer.

BACKGROUND OF THE INVENTION

There are currently many consumer electronics systems which require that information be transmitted between the user's location and a centrally located computer. One example is the direct satellite system (DSS) for television channel distribution. In the DSS system, when a user watches a pay-per-view television program, that information is transmitted back to a central computer via the user telephone line so the viewer can be properly charged for the viewing. For another example, there are currently television set top boxes which are capable of connecting to the internet, using the television screen as the display screen and the television remote as the keyboard. These set top boxes connect the computer in the set top box to the internet service provider (ISP) providing access to the internet via the user telephone line. Data is then sent to the ISP in response to user inputs, and corresponding data received from the ISP for display on the television screen, all under control of the set top box.

Telephone/modem data transfer links between cooperating computers are very well known. However, in the case of an internet set top box, the set top box is not part of a computer system under control of a computer operator. Instead, the user must be able to properly install the set top box with a minimum of technical knowledge.

Prior solutions for enabling a modem to operate automatically have addressed some of these problems. One such example is International Patent application No. PCT/US96/20514 filed Dec. 17, 1996 by Pitsch et al., and entitled, "AN AUTOMATIC SUBSCRIBER CALLBACK SYSTEM." In Pitsch et al., an automatic modem is disclosed for a receiver in a DSS satellite television distribution system. This receiver gathers information, e.g. pay-per-view programs viewed by the subscriber, and transmits this information to a central computer, in an operation termed callback. Pitsch et al. addresses several of the problems of callback modems, which operate in an automatic manner.

First, the disclosed callback modem minimized interference with subscribers' use of their telephone lines. Because a callback can occur automatically at a predetermined time, without any knowledge of whether the subscriber is using the telephone line, the disclosed callback mechanism ensured that such a callback could occur without interfering with the subscriber's use of the telephone line, and without causing interference with, or degradation of, the subscriber's phone operation. More specifically, the callback modem would not attempt a callback if a subscriber was using the telephone line, and immediately released the telephone line whenever the subscriber wanted access to the phone during a callback.

Second, the disclosed callback modem operated automatically with telephone central offices which may have abnormal interface behaviors. Some of the abnormal interfaces presented by central offices include: very short dial tones; pulse dial only; distorted dial tones; 60 Hz modulation on the dial tone; no dial tone; fast busy return tone; long delay before dial tone; and fluctuating telephone line current during telephone access and/or fluctuating current during off hook operation. The disclosed callback modem included a dial tone detector, line current monitor and access algorithm which detected such anomalies and adjusted the modem operation appropriately.

Third, the disclosed callback modem recognized that unknown distortions may be introduced by the telephone line connections between the callback modem and the central computer. Some such distortions were compensated by utilizing an adaptive equalizer, in a known manner. However, in some cases, the dynamic conditions of the telephone line, line loss conditions at the called modem location, and distortions presented by the modem coupling transformer were not correctable using an adaptive equalizer. The disclosed callback modem included power level output control, and possibly data verification and retransmission in severe cases, for compensating for such distortions.

BRIEF DESCRIPTION OF THE INVENTION

The inventors have realized, however, that, while it is important that a modem be able to operate autonomously, as disclosed in Pitsch et al., it is also important that a user is able to easily connect and set up a modem "out of the box". This presents different problems. For example, when operation is attempted for the first time, the modem may not be properly connected to a telephone line, or the telephone line may be in use. It is also possible that the equipment may be installed in an office environment in which a dialing prefix is required to access an outside line. Further, it is possible for the telephone line to have the telephone service known as 'call waiting' installed. It is well known that this service can cause a disruption of an existing modem connection if a call is received for the subscriber telephone line while a data transfer call is in progress. It is desirable for an automatic modem to detect such conditions and operate properly in their presence.

In accordance with principles of the present invention, apparatus for automatically establishing a data connection includes a telephone line interface circuit coupled to a subscriber telephone line, and a modulator and demodulator circuit coupled to the telephone line interface circuit. A control circuit conditions the apparatus to establish a connection to the subscriber telephone line and comprises circuitry to determine whether a central office to which the subscriber telephone line is connected is a tone-dial central office or a pulse-dial-only central office, whether a dialing prefix is necessary to access the subscriber telephone line, and whether the call waiting feature is activated on the subscriber telephone line.

IN THE DRAWING

DETAILED DESCRIPTION

The illustrated embodiment will be described with reference to a television set top box for connecting to the internet. One skilled in the art will understand that the modem described below, however, could be embodied in any equipment which includes a modem. More specifically, such a modem could be embodied in any consumer electronic equipment which requires automatic transmission of data between that equipment and a computer in a central location. In addition, the set top box modem in the illustrated embodiment is described as being controlled using standard modem control codes, such as the codes originally proposed by Hayes Company. One skilled in the art will understand that any modem which may be controlled by, and which provides status signals to, any equipment which may require a data connection over an analog telephone line may be used tin the present invention.

Figure 1:
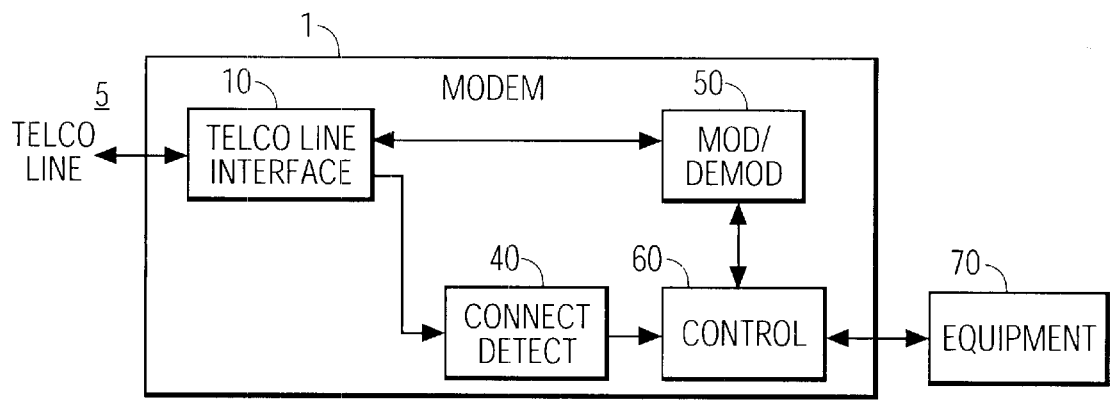
FIG. 1 is a block diagram of a modem according to the present invention.

FIG. 1 is a block diagram of a set top box modem 1 incorporating the present invention. In FIG. 1 an input terminal 5 is coupled to a subscriber telephone company (TELCO) line. The input terminal 5 may include, for example, a standard RJ11 connector. The input terminal 5 is coupled to a first bidirectional terminal of a telephone company (TELCO) line interface circuit 10. The TELCO line interface circuit 10 includes isolation and protection circuitry which protects the remainder of the illustrated circuitry from electromagnetic interference (EMI), electrostatic discharge (ESD), lightning strikes, and so forth, all in a known manner. A second bidirectional terminal of the TELCO line interface circuit 10 is coupled to a corresponding terminal of a modulator and demodulator circuit 50, and an output terminal of the TELCO line interface circuit 10 is coupled to an input terminal of a connection detection circuit 40. An output terminal of the connection detection circuit 40 is coupled to an input terminal of a control circuit 60. A first bidirectional control terminal of the control circuitry 60 is coupled to a corresponding control terminal of the modulator and demodulator circuit 50, and a second bidirectional data terminal of the control circuit 60 is coupled to a corresponding terminal of the electronic equipment, e.g. set top box, 70, in conjunction with which the set top box modem 1 operates. The combination of the TELCO line interface circuit 10, the connection detection circuit 40, the modulator and demodulator circuit 50 and the control circuit 60 form the set top box modem 1. The control circuit 60, which may, for example, include a processor, controls the operation of the set top box modem 1 illustrated in FIG. 1.

When the set top box is used the first time by a user, it is necessary that the box be attached properly to the user telephone line. It is also necessary that the various dialing parameters for the telephone connection be set appropriately to be able to properly place a call to the central computer. Finally, before a call is actually placed, it is necessary that the telephone line to which the set top box is connected be free, i.e. not in use by another user. It is to these aspects that the present invention is directed.

In general, when it is desired to connect the set top box modem 1 to the central computer, the electronic equipment 70 (e.g. set top box) sends a control signal to the control circuit 60 conditioning it to initiate a connection. The connection detection circuit 40 monitors the telephone line 5 via the TELCO line interface 10 to determine whether the TELCO line interface 10 is properly connected to the telephone line 5 and, if so, whether the line is currently in use, in a manner to be described below. The connection detection circuit 40 provides a signal to the control circuit 60 of the telephone line status. If the TELCO line interface 10 is properly connected to the telephone line 5, and the line is not in use, the control circuit 60 sends control signals to, and receives status signals from, the modulator and demodulator circuit 50 conditioning it to initiate the data connection to the central computer.

When the modulator and demodulator circuit 50 is connected to the central computer, the control circuit 60 receives data from the set top box 70 to communicate to, for example, the internet. The control circuit 60 supplies this data to the modulator and demodulator circuit 50, which converts it to audio, in a known manner, for transmission to the internet through an ISP central computer. Simultaneously, the modulator and demodulator circuit 50 receives audio from the internet through the ISP central computer, converts it to data in a known manner and supplies this data to the control circuit 60, which relays this data to the set top box 70 which, for example, displays an image on the television screen in response to the received data.

Figure 2:
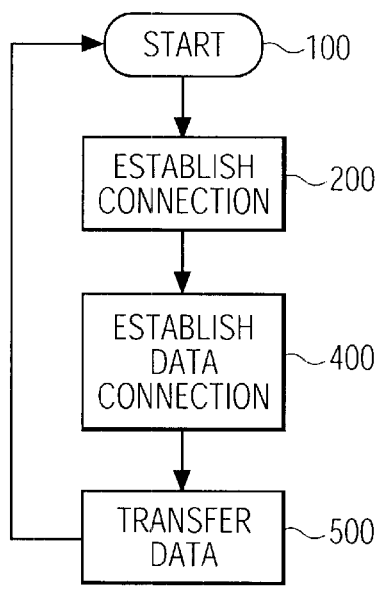
FIG. 2 is a block diagram illustrating the procedures performed by the control circuit of the modem illustrated in FIG. 1 when making a call back.

More specifically, referring to FIG. 2, the set top box modem 1 begins operation at block 100. When the set top box modem 1 desires to make a call to the central computer, block 200 is entered in which the telephone connection is established. If the set top box modem 1 is not properly connected to the telephone line, or if the telephone line is already in use, the subscriber is notified of the problem so that either a proper connection of the set top box modem 1 to the telephone line may be made or the use of the telephone line ended, as the case may be. Then the call is tried again at a later time.

If, on the other hand, the set top box modem 1 is properly connected to the telephone line and the line is free, then the control circuit 60 supplies control signals to the modulator and demodulator circuit 50. If this is the first time the set top box modem 1 is connecting to this user telephone line 5 from this location, then these control signals condition the modulator and demodulator circuit 50 to determine various dialing parameters for this location, in a manner to be described in more detail below. These dialing parameters are then stored in a non-volatile memory. If this is not the first time the set top box modem 1 is connecting to the user telephone line, or if the dialing parameters have been successfully set, as described above, then the control circuit 60 sends control signals to the modulator and demodulator circuit 50 which conditions it to dial the telephone number of the remote computer.

Once the telephone connection to the remote computer is established in block 200, the control circuit 60 supplies a control signal to the modulator and demodulator circuit 50 conditioning it to attempt to establish a data connection to the central computer in block 400. Status signals from the modulator and demodulator circuit 50 are analyzed by the control circuit 60 to determine whether such a connection has been established. If not, various data connection parameters are set and/or varied, in a known manner, in an attempt to establish a connection.

When a data connection has been established in block 400, data transfer is initiated between the set top box modem 1 and the remote computer in block 500. Data from the set top box 70 is supplied to the modulator and demodulator circuit 50 which converts it to audio and transmits it to the central computer. Similarly, the remote computer sends data back to the set top box modem 1, which converts the received audio to data and supplies the received data to the set top box 70 via the control circuit 60. During the data transfer in block 500, the connection is monitored in block 400 to ensure it is maintained, all in a known manner. When the user ends the session, block 100 is reentered.

Figure 3:
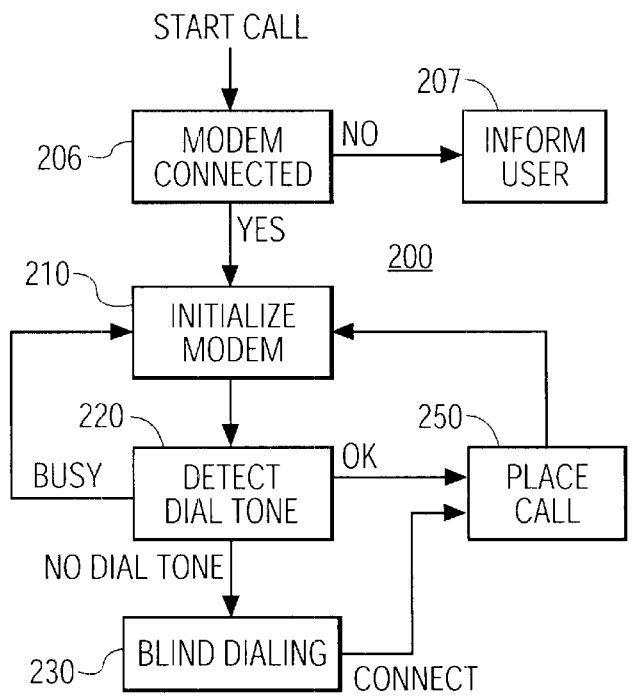
FIG. 3 is a flow diagram illustrating the operation of the telephone line access portion of the block diagram illustrated in FIG. 2.

FIG. 3 is a flow diagram illustrating the operation of block 200 of the block diagram illustrated in FIG. 2 in which the telephone connection is established. When block 200 (of FIG. 2) is entered, indicating the start of a set top box modem 1 call, block 205 of FIG. 3 is entered. In block 205, the telephone line 5 (of FIG. 1) is tested by the connection detection circuit 40 to determine if the set top box modem 1 is properly connected to the telephone line 5, using known line voltage sensing techniques.

The telephone line in the subscriber location is connected to the telephone company central office through two wires in the telephone line 5. The telephone company maintains a voltage across these two lines via a battery in the central office. The connection detection circuit 40 senses this voltage, using a technique known as line voltage sensing (LVS). If no voltage is sensed, then the set top box modem 1 is not properly connected to the telephone line, and a signal is supplied to the control circuit 60 to indicate this.

Assuming that the set top box modem 1 is properly connected to the telephone line 5, when all telephones attached to this line are hung up, termed on-hook, no current (or a very small leakage current) flows through a loop between the two wires. In this case, the voltage across these two wires is at a maximum level. However, when a telephone set is picked up, termed off-hook, a current flows through the loop between the two wires. This current is sensed by the central office, which in response supplies a dial tone to the telephone set. When the telephone set goes off-hook and the current flows between the two wires, the voltage across the two wires decreases. The connection detection circuit 40 senses the decrease in voltage. If a decreased voltage is detected by the connection detection circuit 40, this indicates that the subscriber telephone line is in use, and a signal to indicate this is sent to the control circuit 60.

Alternatively, the control circuit 60 can send control signals to the modulator and demodulator circuit 50 to condition it to go off-hook and wait for a dial tone. This may be done by initiating a dialing sequence and waiting for a dial tone, but not performing the dialing itself (command ATDTW; in the Hayes Corporation command set). When the command has been executed, the modulator and demodulator circuit 50 supplies one of three responses to the control circuit 60: a dial tone has been detected (response OK in the Hayes Corporation response set); a busy signal has been detected (response BUSY); or no dial tone has been detected (response NO DIAL TONE). If no dial tone is detected (response NO DIAL TONE) it is assumed that either the set top box modem 1 is not connected properly to the telephone line 5, or the line is in use. Otherwise, it is assumed that the set top box modem 1 is properly connected to the telephone line 5 and that the telephone line is not, otherwise, in use.

If the set top box modem 1 is not properly connected to the telephone line 5, then the user is informed in block 207. The user must then either manually remove power from the set top box, connect the set top box modem 1 properly to the telephone line 5, then reapply power; or ensure that the telephone line to which the set top box 1 is connected is not otherwise in use. The call may then be attempted again.

If the set top box modem 1 is properly connected to the telephone line 5, then block 210 is entered. In block 210, the modulator and demodulator circuit 50 is initialized in response to control signals supplied to it by the control circuit 60. In a preferred embodiment, this initialization includes: (1) setting the modulator and demodulator circuit 50 to dial whether or not a dial tone is detected, and to detect a busy signal (command X3); (2) setting the time to wait for a carrier after dialing to 30 seconds (register S07=30); (3) setting the time to wait before blind dialing to two seconds (registerS06=2).

After the modulator and demodulator circuit 50 is initialized in block 210, as described above, the telephone connection is tested to detect a dial tone in block 220. In a preferred embodiment, this is done by initiating a dialing sequence and waiting for a dial tone, but not performing the dialing itself (command ATDTW;). The modulator and demodulator circuit 50 generates one of three responses: a dial tone has been detected (response OK); a busy signal has been detected (response BUSY); or no dial tone has been detected (response NO DIAL TONE). If a dial tone is detected (response OK), the callback may continue by entering block 250, to be described in more detail below. If a busy signal is detected, then the call is attempted at a later time by initiating a delay and then reinitializing the modulator and demodulator circuit 50 in block 210. If the busy signal persists for some predetermined length of time, the user may be informed and given the option to manually try again later.

If, however, no dial tone is detected in block 220, the unit is assumed that the dial tone is sufficiently non-standard that the modulator and demodulator circuit 50 cannot accurately detect its presence. In this case block 230 is entered in which the number will be dialed without waiting for a dial tone to be detected, termed blind dialing, in a known manner. When the blind dialing process is complete, the call is placed by entering block 250.

Figure 4:
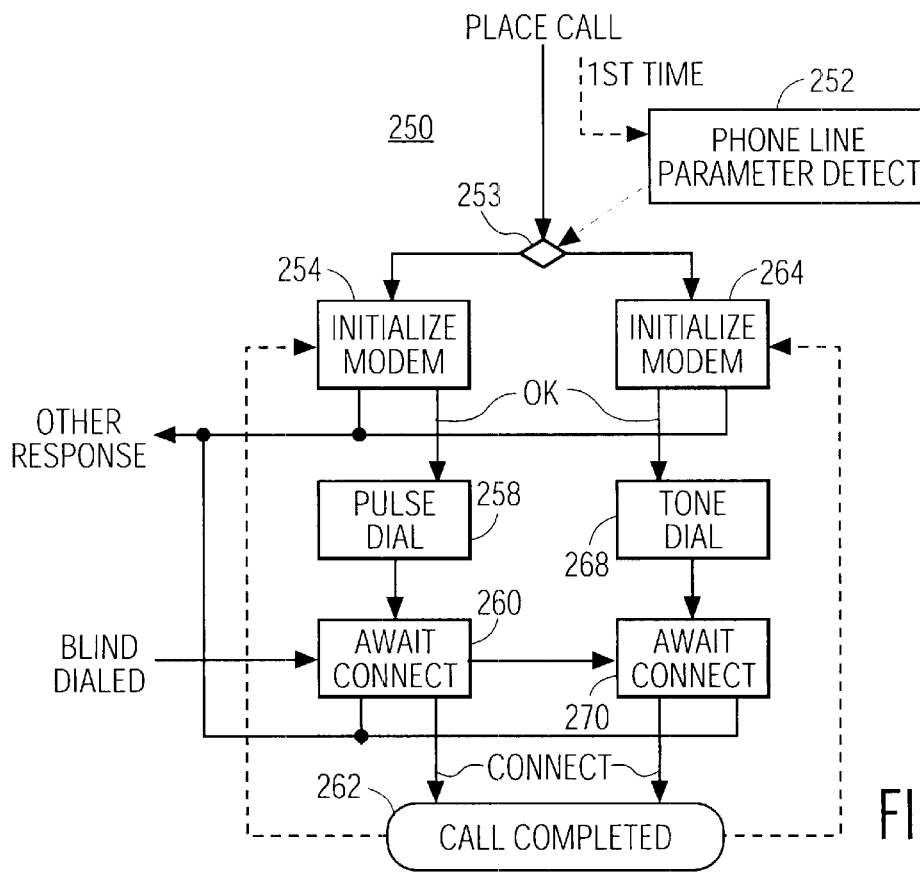
FIG. 4 is a block diagram illustrating the operation of the dialing portion of the block diagram illustrated in FIG. 3.

FIG. 4 is a block diagram illustrating the operation of the dialing portion 250 of the block diagram illustrated in FIG. 3. The first time block 250 is entered upon power up, or after a reset, block 252 is entered. In block 252, dialing parameters of the connection of the telephone line 5 to the central office are detected, in a manner to be described in more detail below. One of the parameters detected by block 252 is whether the central office accepts only pulse dialing. Under control of the determination made by the phone line parameter detector block 252, if the central office accepts only pulse dialing, then the left side of FIG. 4 is performed, and if the central office accepts tone dialing, then the right side of FIG. 4 is performed, as indicated by the small decision block 253 and dashed line from phone line parameter detector block 252 to the decision block 253.

Referring now to pulse-dial-only central offices, when a central computer is to be dialed, the modulator and demodulator circuit 50 (of FIG. 1) is initialized in block 254. In a preferred embodiment, the control circuit 60 supplies commands to the modulator and demodulator circuit 50 conditioning it to not wait for dial tone before dialing, but to recognize a busy signal (command X3); set the time to wait before blind dialing to 2 seconds (register S06=2); and set the time to wait for a carrier after dialing to 30 seconds (register S07=30). The modulator and demodulator circuit 50 then connects to the telephone line 5 for pulse dialing and waits for a dial tone, but doesn't dial the number (command ATDPW;). If the modulator and demodulator circuit 50 receives a dial tone, the modulator and demodulator circuit 50 will issue a response to indicate this (response OK). Any other response from the modulator and demodulator circuit 50 results in a return to block 210 (of FIG. 3) where the process of initiating the call is restarted.

If the modulator and demodulator circuit 50 receives a dial tone in block 254, block 258 is performed. In block 258, the telephone number of the remote computer system is pulse-dialed (command ATDP[telephone number]). After the telephone number is dialed, either in block 258, or blind dialed in block 230 (of FIG. 3), the control circuit 60 awaits an indication from modulator and demodulator circuit 50 that a connection has been established in block 260. If the modulator and demodulator circuit 50 successfully connects to the remote computer after dialing, the modulator and demodulator circuit 50 issues a response indicating this (response CONNECT). The call is now completed, as illustrated in block 262, and data transfer(block 400 of FIG. 2) will take place. If the call is not completed, as indicated by any other response from the modulator and demodulator circuit 50, then block 210 (of FIG. 3) is entered where the process of initiating the call is restarted. The next time block 250 is entered, there is no need to detect whether the central office is pulse-dial-only or tone dial, so block 252 will not be performed. Instead, block 253 will be performed on entry, as indicated by the dashed line from block 252 to block 253.

Referring now to tone dial central offices, when the central computer is to be dialed, the modulator and demodulator circuit 50 (of FIG. 1) is initialized in block 264. In a preferred embodiment, the control circuit 60 supplies commands to the modulator and demodulator circuit 50 conditioning it to not wait for dial tone before dialing, but to recognize a busy signal (command X3); sets the time to wait before blind dialing to 2 seconds (register S06=2); and sets the time to wait for a carrier after dialing to 30 seconds (register S07=30). The modulator and demodulator circuit 50 then connects to the telephone line for tone dialing and waits for a dial tone, but doesn't dial a number (command ATDTW;). If the modulator and demodulator circuit 50 receives a dial tone, the modulator and demodulator circuit 50 will issue a response to indicate this(response OK). Any other response from the modulator and demodulator circuit 50 results in a return to block 210 (of FIG. 3) where the process of making the callback is restarted. If the modulator and demodulator circuit 50 receives a dial tone in block 264, block 268 is performed. In block 268, the telephone number of the remote computer system is tone dialed(command DT[telephone number]). Then, block 270 is entered. If the modulator and demodulator circuit 50 (of FIG. 1) successfully connects to the remote computer after dialing, the modulator and demodulator circuit 50 issues a response indicating this (response CONNECT). The call is now completed, as illustrated in block 262, and data transfer will take place(block 400 of FIG. 2). If the call is not completed, as indicated by any other response from the modulator and demodulator circuit 50, then block 210 (of FIG. 3) is reentered where the process of initiating the call is restarted. The next time block 250 is entered, there is no need to detect whether the central office is pulse-dial-only or tone dial, so block 252 will not be performed. Instead, block 264 will be performed one entry, as indicated by the dashed line from block 252 to block 253.

Figure 5:
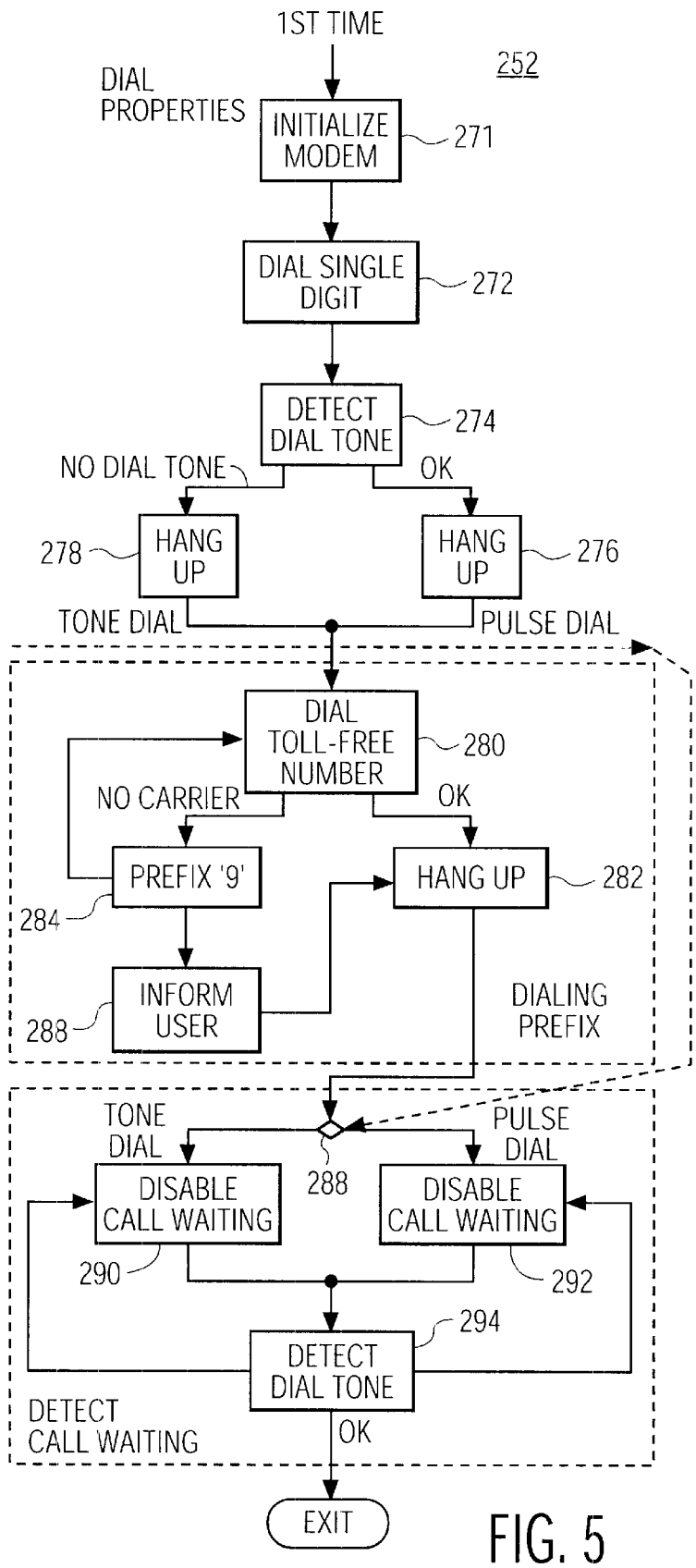
FIG. 5 is a block diagram illustrating the operation of the dialing parameter detector of the block diagram illustrated in FIG. 3.

FIG. 5 illustrates the phone line parameter detector 252(of FIG. 3). The operations illustrated in FIG. 5 are performed once, the first time the set top box modem 1 dials the remote computer after initial power application, or after are set, as described above. First, the dialing properties of the central office to which the set top box modem 1 is attached are determined. In block 271, the modulator and demodulator circuit 50 (of FIG. 1) is initialized. Then, in block 272, atone dialing sequence dialing only a single number, e.g. "1" (command DT1;), is initiated, and the time to wait for a carrier after dialing is set to 7 seconds (register S07=7). Then, in block 274, the modulator and demodulator circuit 50 is conditioned to detect a dial tone (command DTW;). If a dial tone is detected this means that the central office did not recognize the single tone-dialed digit and is still waiting to receive the first dialed digit, i.e. the central office recognizes only pulse dialing. In this case, the modulator and demodulator circuit 50 produces a response to indicate recognition of a dial tone (response OK). The modulator and demodulator circuit 50 is conditioned to hang up (command H0) in block 276, and pulse dialing will be used. If a dial tone is not detected, this means that the central office recognized the single tone dialed digit and is waiting for further digits, i.e. the central office recognizes tone dialing. In this case, the modulator and demodulator circuit 50 produces a response to indicate that no dial tone was detected (response NO DIAL TONE). The modulator and demodulator circuit 50 is conditioned to hang up (command H0) in block 278, and tone dialing will be used.

Then, it is determined if a dialing prefix is required to dial the phone number of the central computer. In block 280 of the illustrated embodiment, the control circuit 60 conditions the modulator and demodulator circuit 50 to dial a toll-free telephone number for the central computer (command ATDx1800[telephone number]) with no prefix. If the modulator and demodulator circuit 50 successfully connects to the central computer, the modulator and demodulator circuit 50 generates a result indicating this (result OK). This indicates that no prefix is necessary, and the number of the central computer, stored in a non-volatile memory (not shown) is left unchanged. In this case the modulator and demodulator circuit 50 is conditioned to hang up (command H0) in block 282.

On the other hand, if the modulator and demodulator circuit 50 does not successfully connect to the central computer, the modulator and demodulator circuit 50 generates a result indicating this (result NO CARRIER). In this case, it is assumed that the electronic equipment in which the set top box is in an office environment served by a PBX, and a dialing prefix is required to access an outside telephone line. In block 284, a standard dialing prefix, e.g. '9', for obtaining an outside line in such an environment is prefixed to the toll-free telephone number. The modified telephone number with the prefix is stored in the non-volatile memory. All subsequent telephone calls placed to the central computer will use this modified telephone number. Then the call is repeated using the telephone number with the prefix in block 280 (command ATDx9W1800[telephone number]) in block 280. If the modified telephone number successfully connects to the central computer, then, again, block 282 is entered. If not, block 284 is entered again. It is possible to try a list of respective such prefixes, one at a time, in block 284, and sequentially to state one by reentering block 280, as described above. It is further possible that the list of possible prefixes could be ordered from most likely (e.g. "9") to least likely possible prefixes. It is further possible that the list be configurable, and further possible that the list could be downloaded into a nonvolatile memory of the set top box modem 1 from the central computer. In this way, as new prefixes are found, they may be transmitted to the existing set top boxes to update the list of prefixes.

If none of the prefixes in the list supplied by the processing in block 284 allow successful connection to the central computer, then the user is informed of this in block 286. The user must then give the correct dialing prefix. This newly entered prefix may be transmitted to the central computer in order to update the central list of possible dialing prefixes, which may, then, be transmitted to the set top boxes, as described above. The telephone number with the correct dialing prefix is stored in the non-volatile memory in the set top box modem 1. All subsequent telephone calls will use the stored telephone number with the correct dialing prefix. The modulator and demodulator circuit 50 is then conditioned to hang-up(command H0) in block 282.

In an alternative embodiment, in block 280 of the illustrated embodiment, the control circuit 60 conditions the modulator and demodulator circuit 50 to dial a single digit representing a possible dialing prefix and wait for a dial tone. In the alternative embodiment, this prefix is the single digit "9" (command ATDX9W;). If a dial tone is detected, the modulator and demodulator circuit 50 generates a signal to indicate this (response OK). This indicates that an outside line has been reached, and the central office is waiting for telephone number. The telephone number of the central computer is modified to include the prefix "9" and the modified number is stored in the non-volatile memory. This modified number will be used whenever the central computer is called.

If no dial tone is received, then block 284 is entered. In block 284, a different prefix, e.g. "8" is selected as the possible dialing prefix. Block 280 is reentered in which the new prefix is dialed. If a dial tone is detected, then this prefix is prefixed to the telephone number of the central computer and the modified number stored in the non-volatile memory. In the same manner described above, a list of possible prefixes may be tried in this manner until the correct one is determined. As above, this list may be ordered in probability, configurable and downloadable.

Finally it is determined if the telephone line includes the 'call waiting' feature. This feature, provided by the telephone company, allows the user currently using the telephone line to receive a signal from the central office whenever second call is being received. This signal is in the form of a tone. Such a tone received during a data call, however, is known to adversely affect the data call, leading to data corruption, and possibly to disconnection of the data call. The callback feature includes a corresponding feature which enables a user to disable the callback feature before a call is dialed. This permits a data call to be made without the possibility of interference by a 'call waiting' signal, all in a known manner.

If the central office to which the set top box modem 1 is connected is a tone dial central office, then block 290 is entered, as illustrated by the small decision block 288, based on the results of the testing performed by blocks 270 through 278 (illustrated by the dashed line between the dial properties block and the call waiting block). In tone dialed systems, there are two numbers for disabling the call waiting feature: dialing '*70' or dialing '70#' before dialing the telephone number. In pulse dialed systems, there are also two numbers for disabling the call waiting feature: dialing 1170 or dialing 7011. In any case, if the call waiting feature is present, after dialing the disable number, a second dial tone will be received, to allow the subscriber to dial the desired telephone number.

In block 290 first the disable number '*70' is dialed and the modulator and demodulator circuit 50 is conditioned to wait for a dial tone to be detected (command ATDT*70W;). If the call waiting feature is enabled, and if '*70' is the number for disabling it, then a dial tone will result. If a dial tone is detected in block 294, then the modulator and demodulator circuit 50 produces a code to indicate this (result OK). In this case, the prefix '*70' is prefixed to the currently stored telephone number (after the dialing prefix, if any) along with a direction to wait for a dial tone after dialing the disable code.

If no dial tone is detected in block 294, then block 290 is reentered. The disable number '70#' is dialed and the modulator and demodulator circuit 50 conditioned to wait for a dial tone (command ATDT70#W;). If the call waiting feature is enabled and this is the number for disabling it, then a dial tone will result. If a dial tone is detected in block 294, then the modulator and demodulator circuit 50 will produce a code to indicate this (result OK). In this case the prefix'70#' is prefixed to the currently stored telephone number(after the dialing prefix, if any) along with a direction to wait for a dial tone after dialing the disable code.

If no dial tone is detected in block 294 this time, then the telephone line to which the set top box modem 1 is connected does not have the call waiting feature enabled, and to disable number is prefixed to the telephone number.

Similar processing occurs if the central office to which the set top box modem 1 is connected is a pulse-dial-only central office. In this case, block 292 is entered from decision block 288. In block 292, first the disabling code 1170 is dialed, and the modulator and demodulator circuit 50 conditioned to wait for a dial tone (command ATDP1170W;). If adial tone is detected in block 294, this indicates that callwaiting is enabled and that 1170 is the code to disable it. In this case, 1170 is prefixed to the telephone number (after the dialing prefix, if any) along with a direction to wait for adial tone after dialing the disable code.

If no dial tone is detected, then block 292 is reentered and the disable code 7011 is dialed, and the modulator and demodulator circuit 50 is conditioned to wait for a dial tone in block 294. If a dial tone is detected, this indicates that call waiting is enabled and this is the code to disable it. In this case, 7011 is prefixed to the telephone number (after the dialing prefix, if any) along with a direction to wait for adial tone after dialing the disable code.

If no dial tone is detected in block 294 this time, then the telephone line to which the set top box modem 1 is connected does not have the call waiting feature enabled, and no disable code is prefixed to the telephone number. At this point, decision block 253 (of FIG. 3) is entered and the call to the central computer is placed.

As with determining a proper dialing prefix to access an outside line, described above, there may be other codes for disabling call waiting. A list of possible such codes may be maintained in the control circuit 60. These codes are tried, one by one by blocks 290 and 294, for tone dialing, or blocks 292 and 294 for pulse dialing. Also as before, the list of possible codes for disabling call waiting may be ordered from the most likely code to the least likely, it may be configurable and it may be downloadable from the central computer.

It will be understood that various changes in the details, materials, and arrangements of the parts which have been described and illustrated above in order to explain the nature of this invention may be made by those skilled in the art without departing from the principle and the scope of the invention as recited in the following claims.

What is claimed is:

1. An apparatus for automatically detecting whether a call waiting feature is activated on a telephone line so that the apparatus may be automatically configured, comprising:

a telephone line interface circuit coupled to the telephone line;

a controller operative to dial automatically a first predetermined code and sending the first predetermined code through the telephone line interface circuit in a first time setup mode; the controller determining that the call waiting feature is activated if a dial tone is detected on the telephone line after the dialing of the first predetermined code; and the controller performing subsequent dialing procedure based on the determining step in response to the determination that the call waiting feature is activated.

2. The apparatus of claim 1 wherein the apparatus attempts to complete a subsequent telephone call by first dialing the first predetermined code followed by a first stored telephone number, if the controller determines that the call waiting feature is activated.

3. The apparatus of claim 2 wherein the apparatus waits for a dial tone after dialing the first predetermined code, before dialing the first stored telephone number.

4. The apparatus of claim 1 wherein the apparatus dials a second predetermined code if a dial tone is not present on the telephone line after the dialing of the first predetermined code.

5. A method for an apparatus to automatically detect whether a call waiting feature is activated on a telephone line so that the apparatus may be automatically configured, comprising the steps of:

dialing a first predetermined code; and determining automatically, in a first time setup mode, that the call waiting feature is activated if a dial tone is detected on the telephone line after the dialing of the first predetermined code. performing subsequent dialing procedure based on the determining step in response to the determination that the call waiting feature is activated.

6. The method of claim 5 comprising the further step of attempting to complete a subsequent telephone call by first dialing the first predetermined code followed by a first telephone number, if it is determined that the call waiting feature is activated.

7. The method of claim 6 further comprising the step of waiting for a dial tone after dialing the first predetermined code, before dialing the first telephone number.

8. The method of claim 5 further comprising dialing a second predetermined code if a dial tone is not present on the telephone line after the dialing of the first predetermined code.

9. The method for an apparatus to automatically detecting whether a dialing prefix is required on a telephone line so that the apparatus may be automatically configured to complete a telephone call, comprising the steps of:

dialing a telephone number with no dialing prefix;

detecting whether a connection is completed via the dialing step;

if a connection is detected, determining that no dialing prefix is necessary, otherwise determining that a dialing prefix is necessary; and dialing a first predetermined call waiting disabling code after dialing the dialing prefix, to determine whether call waiting feature is activated on the telephone line, if the apparatus determines that the dialing prefix is necessary.

* * * * *